Aug. 29, 1950  E. J. SOVATKIN  2,520,223
TONOMETER
Filed Jan. 29, 1948
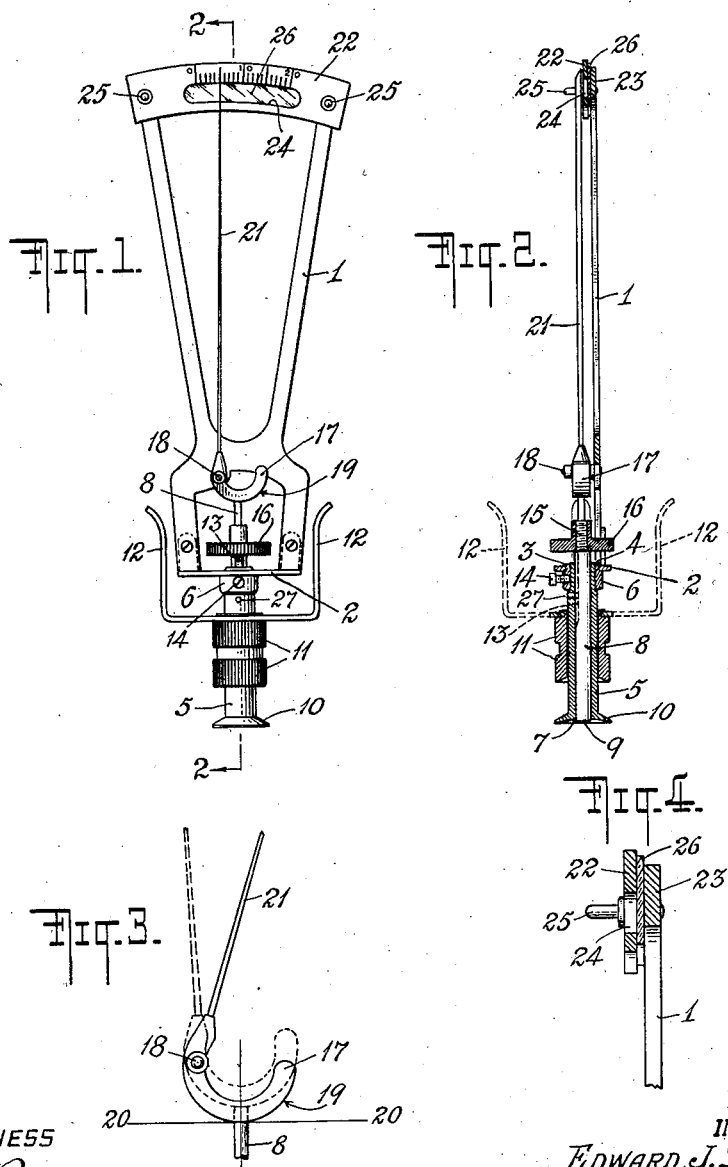
WITNESS
G. V. Rasmussen
INVENTOR.
EDWARD J. SOVATKIN
BY
Klein, Alexander Pohl
ATTORNEYS Patented Aug. 29, 1950

2,520,223

UNITED STATES PATENT OFFICE 2,520,223

TONOMETER

Edward J. Sovatkin, New York, N. Y., assignor to
J. Sklar Manufacturing Co., Inc., Long Island
City, N. Y., a corporation of New York Application January 29, 1948, Serial No. 5,055

3 Claims. (Cl. 73—80)

The object of this invention is to provide a tonometer, for measuring ocular tension by registering the depth of indentation produced in the cornea, in which the friction load between the plunger and hammer, as well as between the plunger and cylinder, has been greatly minimized and the sensitivity of the device, as well as its life and dependability, is increased. Another feature of this invention resides in a scale construction which overcomes the effect of parallax, which has been the source of error, in prior devices, in determining the exact reading in the scale in relation to the pointer.

In the drawings Fig. 1 is a front elevation of the actual size of the tonometer; Fig. 2 is a section on the line 2—2 of Fig. 1; Fig. 3 is a twice enlarged detail showing two positions of the pointer hammer and plunger of Fig. 1 under different conditions of use and Fig. 4 is an enlarged detail of the upper portion of Fig. 2.

The frame 1 is provided with a bridge piece 2 in the form of a plate having a central aperture 3 therein in which the upper reduced portion of the internally threaded collar 6 is secured by swaging or otherwise. The upper threaded end 4 of the cylinder 5 is secured to the collar by such threads and the cylinder is secured, against rotation, to the collar 6 by the set screw 14. The plunger 8 has a sliding fit within the bore 7, the lower end 9 of the plunger normally extending beyond the foot plate 10. A sleeve which has two knurled portions 11, is mounted around the outer surface of the cylinder and carries two handles 12, the sleeve having free sliding movement on the cylinder. The plunger 8 is formed with a slot 13 into which the pin 27 enters, which pin passes through the cylinder 5. The size of the slot 13 is such, in relation to the diameter of the pin 27, so as not to interfere with the free movement of the plunger 8 in the cylinder 5. The plunger 8 at its upper portion is provided with a screw threaded reduced portion 15 on which the screw threaded portion of the hub of the load or weight 16 is removably secured, whereby the load is carried by the plunger. The combined weight load of the load 16, the plunger 8, hammer 17 and pointer 21 equal 5.5 grams and when the tonometer is utilized it affords a measurement of very low tension. Two additional loads or weights (not shown) are usually provided with such an instrument, weighing respectively 2 grams and 4.5 grams. Either of these added weights may be laid on top of the weight 16 being suitably perforated to be carried by the hub of the weight 16 and with the weight 16 providing a load of 7.5 or 10 grams, in order to provide means of measuring higher tensions than that provided by the load 5.5 grams. The extension of the lower surface of the plunger 8 beyond the lowermost edge of the foot plate 10 is limited to 3 mm. by the engagement of the under face of the weight against the top edge of the cylinder 5.

The hammer 17 is pivoted on the pin 18, being freely movable thereon. The hammer 17 has a convex under surface 19 which is a radius of a circle, the center whereof lies in a line through the vertical axis of the plunger 8. The distance from the axis of the plunger 8, measured from a vertical line drawn through the center of the pivot 18, is 4 mm. The maximum extent of movement of the top face of the plunger over the surface 19 of the hammer 17 is approximately 1.5 mm. and this represents a movement of the pointer over the scale from the 20th graduation to 0. In consequence, the convex shape of the under surface of the hammer and its relation to the contact face of the plunger is along a straight line 20—20 and the relative movement of the plunger with respect to the hammer as the device is utilized for measuring tension is always on a straight line reducing the friction load between plunger and hammer, as well as between the plunger and cylinder, increasing sensitivity, as well as the life and dependability, of the instrument.

The end of the hammer, above the pivot 18, carries a pointer 21 which moves over a graduated scale plate 22 secured to the top arched plate 23 which is part of the frame 1. The scale plate is provided with an elongated oval recess 24 behind which is positioned a mirror, preferably made of highly polished metal. The reflecting face of the mirror 26 is spaced back from the front face of the graduation equal to the thickness of the scale plate. As the needle moves over the face of the scale plate, the physician reading the tonometer determines the line on the scale directly below the pointer by focusing the pointer in line with its image in the mirror, eliminating parallax and giving an accurate reading. The two pins 25 secure the scale plate and mirror to the arched plate 23 and confine the lateral movement of the needle to within the sphere of the scale plate.

I claim:

1. A tonometer comprising a frame, a support, a cylinder suspended from the support, a plunger positioned in the bore of the cylinder and having portions normally extending beyond both ends of the support, a sleeve encircling the cylinder and having a pair of handles extending upwards from the sleeve, a load carried by the plunger, a graduated scale carried at the upper portion of the frame, a hammer pivoted to the frame, the hammer having a convex under surface facing the top edge of the plunger, said convex surface of the hammer being formed on an arc of a circle, the center whereof lies in the line of the axis of said plunger, whereby said plunger and convex face of the hammer, when the hammer and plunger have relative movement, contacting along a straight line, a pointer carried by the upper portion of the hammer, a mirror bordering the scale graduations, a portion of the pointer traversing said scale and mirror whereby the image of the traversing portion of the pointer is reflected in said mirror and the said image and said traversing portion of the pointer may be aligned in respect of a graduation on said scale.

2. A tonometer comprising a frame, a support, a cylinder suspended from the support, a plunger positioned in the bore of the cylinder and having portions normally extending beyond both ends of the support, a sleeve encircling the cylinder, means on the cylinder providing a hand support, a load carried by the plunger, a graduated scale carried at the upper portion of the frame, a hammer pivoted to the frame, the hammer having a convex under surface facing the top edge of the plunger, said edge engaging said convex surface, said convex surface of the hammer being formed on an arc of a circle, the center whereof lies in the line of the axis of said plunger, whereby said plunger and convex face of the hammer, when the hammer and plunger have relative movement, contacting along a straight line, a freely operating pointer carried by the upper portion of the hammer, a portion of the pointer traversing said scale when the plunger moves upwardly.

3. In a tonometer, according to claim 2, wherein the center of the pivot of the hammer lies substantially 4 mm. from a line through the axis of the plunger.

EDWARD J. SOVATKIN.

REFERENCES CITED

The following references are of record in the file of this patent:

UNITED STATES PATENTS

| Number | Name | Date |
| --- | --- | --- |
| 1,291,050 | McLean | Jan. 14, 1919 |
| 1,401,119 | Aldeborgh | Dec. 27, 1921 |
| 1,595,727 | Pierce | Aug. 10, 1926 |
| 2,314,514 | Parsons | Mar. 23, 1943 |
| 2,366,645 | Ollendorff | Jan. 2, 1945 |